United States Patent
Wiese

(10) Patent No.: US 7,036,791 B2
(45) Date of Patent: May 2, 2006

(54) METHOD FOR THE CONTACTLESS DETECTION OF THE POSITION OF A BUTTERFLY VALVE SHAFT OF A BUTTERFLY VALVE CONNECTING PIECE AND BUTTERFLY VALVE CONNECTING PIECE

(75) Inventor: Peter Wiese, Kelkheim (DE)

(73) Assignee: Siemens Aktiengesellschaft, Wittelsbacherplatz 2, Munich (DE)

( * ) Notice: Subject to any disclaimer, the term of this patent is extended or adjusted under 35 U.S.C. 154(b) by 0 days.

(21) Appl. No.: 10/739,052

(22) Filed: Dec. 19, 2003

(65) Prior Publication Data

US 2004/0129909 A1 Jul. 8, 2004

Related U.S. Application Data

(63) Continuation of application No. PCT/DE02/02129, filed on Jun. 11, 2002.

(30) Foreign Application Priority Data

Jul. 11, 2001 (DE) .......................... 101 33 631

(51) Int. Cl.
*F16K 31/02* (2006.01)

(52) U.S. Cl. .............. 251/129.04; 137/554; 324/207.25
(58) Field of Classification Search ............ 251/129.04, 251/65, 305; 137/554; 324/207.2, 207.22, 324/207.25
See application file for complete search history.

(56) References Cited

U.S. PATENT DOCUMENTS 4,893,502 A * 1/1990 Kubota et al. ........... 324/207.2
4,926,903 A * 5/1990 Kawai ................... 251/129.04
5,055,781 A * 10/1991 Sakakibara et al. ..... 324/207.25

(Continued)

FOREIGN PATENT DOCUMENTS

DE 40 14 885 C2 7/1995
DE 196 19 755 A1 11/1997
DE 198 12 307 C2 4/2000

(Continued)

OTHER PUBLICATIONS

Derwent–Abstract DE 10024426A1; Nov. 22, 2001; Pierburg AG, D–41460 Neuss.
Derwent–Abstract DE 4014885C2; Jul. 13, 1995; Aisan Kogyo K.K. JP Obu, Aichi.

(Continued)

*Primary Examiner*—Eric Keasel
(74) *Attorney, Agent, or Firm*—Jacob Eisenberg; Siemens Switzerland

(57) ABSTRACT

The invention relates to a method for the contactless detection of the position of a butterfly-valve shaft of a butterfly valve connecting piece, the butterfly-valve shaft being driven by an electric actuator and having a magnet at one end, which is aligned in a contactless manner with a sensor that is located on a cover. An aim of the invention is to reliably guarantee the detection of the position of the butterfly-valve shaft, even over particularly long periods of time using a contactless position detection device. To achieve this, the sensor has a first and a second magnetoresistive sensor element, an approximately sinusoidal signal being generated in the first sensor element and an approximately cosinusodial signal being generated in the second sensor element by means of the magnet, during the rotation of the butterfly-valve shaft. According to the method, an approximately arc tangential signal is generated in the butterfly-valve connecting signal. The control signal is fed to the actuator that is located in the butterfly-valve connecting piece, to adjust the position of the butterfly-valve shaft.

11 Claims, 7 Drawing Sheets

U.S. PATENT DOCUMENTS

| | | | | |
|---|---|---|---|---|
| 5,241,268 | A | * | 8/1993 | Lee ................. 324/207.25 |
| 5,497,081 | A | * | 3/1996 | Wolf et al. ........... 324/207.25 |
| 5,564,470 | A | * | 10/1996 | Denmark et al. ........... 137/554 |
| 5,624,100 | A | | 4/1997 | Bolte et al. |
| 6,182,690 | B1 | * | 2/2001 | Robert ................. 137/554 |
| 6,244,296 | B1 | * | 6/2001 | Lafler et al. ........... 137/554 |
| 6,279,870 | B1 | * | 8/2001 | Welz et al. ........... 251/129.04 |
| 6,581,569 | B1 | * | 6/2003 | Arsic et al. ........... 123/399 |

FOREIGN PATENT DOCUMENTS

| | | |
|---|---|---|
| DE | 100 24 426 A1 | 11/2001 |
| EP | 0 859 139 A2 | 8/1998 |
| EP | 1 002 943 A2 | 5/2000 |
| JP | 0080068606 AA | 3/1996 |

OTHER PUBLICATIONS

Derwent–Abstract DE 19812307C2; Apr. 13, 2000; Siemens AG, D–80333 Munich and Siemens Automotive SA, F–Toulouse.

Derwent–Abstract DE 19619755A1, Nov. 20, 1997; Gerd Hörmansdörfer, D–31303 Burgdorf.

* cited by examiner

METHOD FOR THE CONTACTLESS DETECTION OF THE POSITION OF A BUTTERFLY VALVE SHAFT OF A BUTTERFLY VALVE CONNECTING PIECE AND BUTTERFLY VALVE CONNECTING PIECE

CROSS REFERENCE TO RELATED APPLICATIONS

The present application is a continuation of international application PCT/DE02/02129, filed Jun. 11, 2002, and which designated the United States, and further claims priority to German reference 10133631.4, filed Jul. 11, 2001, the both of which are herein incorporated by reference.

BACKGROUND OF THE INVENTION

The invention relates to a method for the contactless detection of the position of a butterfly valve shaft of a butterfly valve connecting piece, the butterfly valve connecting piece having a housing which can be closed off by a lid, and a throttle orifice which is arranged in the housing, for a butterfly valve which is arranged on the butterfly valve shaft, the butterfly valve shaft being capable of being driven by an electric actuator drive and having, at one of its ends, a magnet which is arranged in contactless alignment with a sensor which is arranged on the lid. It also relates to a butterfly valve connecting piece having a housing which can be closed off by a lid, and having a throttle orifice which is arranged in the housing, for a butterfly valve which is arranged on a butterfly valve shaft, the butterfly valve shaft being capable of being driven by an electric actuator drive and having, at one of its ends, a magnet which is arranged in contactless alignment with a sensor which is arranged on the lid.

Butterfly valve connection pieces are generally used to control the quantity of fresh gas in a motor vehicle. Butterfly valve connecting pieces comprise a housing with a throttle orifice and a throttle element which is arranged in the throttle orifice. The throttle element generally comprises a butterfly valve which is arranged on a butterfly valve shaft and which is arranged so as to be capable of pivoting in the housing of the butterfly valve connecting piece. The butterfly valve assumes a specific position in the throttle orifice to permit a specific quantity of fresh gas to pass through. For this purpose, the butterfly valve shaft can be actuated mechanically or electromechanically.

When the butterfly valve shaft is actuated electromechanically, the butterfly valve connecting piece normally has a position detection device which can be used to detect the current position of the butterfly valve shaft. Depending on the respective current position of the butterfly valve shaft, a signal, with which the butterfly valve shaft can be actuated using the actuator drive arranged in the butterfly valve connecting piece, is then generated either inside or outside the butterfly valve connecting piece.

With respect to these position detection devices, a distinction is made between those in which contact with the butterfly valve shaft is at least indirectly necessary in order to detect the respective current position of the butterfly valve shaft, and on the other hand contactless position detection devices. A position detection sensor which is not contactless is a potentiometer in which a sliding contact which is coupled to the rotary movement of the butterfly valve shaft moves back a certain distance along a contact surface when there is a rotary movement of the butterfly valve shaft, the distance by which the sliding contact moves back being a measure of the rotary movement of the butterfly valve shaft. Such potentiometers are subject to a certain degree of wear which is decisively determined by the mechanical abrasion between the sliding contact and the contact path.

In order to reliably avoid mechanical wear of position detection devices which are not contactless, butterfly valve connecting pieces have been developed in which the detection of the rotary movement of the butterfly valve shaft can be carried out in a contactless fashion. An example of such a contactless sensor is a Hall sensor which is positioned in alignment with a ring magnet which is arranged on the butterfly valve shaft. This Hall sensor supplies a signal which is proportional to the magnetic induction B which is generated by the magnetic field of the ring magnet. The ring magnet generally comprises an outer shielding ring, and, in the interior, two flux permeable parts which are arranged approximately in parallel. The Hall sensor is then located in the gap between the two flux permeable parts. This principle is well protected against magnetic interference fields as they are kept away from the Hall sensor by the outer shielding ring. The linear, usable measuring range is however restricted to approximately two times 75° in the case of this principle. For this reason, the magnetic zero point cannot be positioned in the mechanical idling stop (butterfly valve closes the throttle orifice virtually completely) in order to detect the typical butterfly valve working range, and would therefore be outside the idling position of the butterfly valve. However, as the measuring precision is highest at the magnetic zero point and decreases with increasing distance from the magnetic zero point, the measuring precision in the idling range of the butterfly valve would then be smaller than in a range which is positioned between the idling range and the full load range. This does not correspond to the customary precision requirements made of a contactless position detection device for a butterfly valve shaft of a butterfly valve connecting piece in which the measuring precision is to be highest during idling.

Alternatively, the Hall sensor can project vertically into a parallel field which is formed between two magnet squares connected by means of a yoke, the magnet squares being permanently connected to the butterfly valve shaft. This principle is known from JP 8 068 606 A. The necessary signal amplification is carried out here in evaluation electronics which are connected to the Hall sensor via a punched grill. The electrical interface with the outside is also produced here by means of a punched grill or else lead frame which is formed into plug contacts at its ends. According to this principle, linearization is dispensed with in an angular range of approximately +/– 45° around the zero crossover, which involves concessions in terms of linearity. Given customary working angles of less than 90°, it is theoretically possible to detect the butterfly valve position if the zero crossover is positioned in the center of the measurement range. However, the idling range would then be located in a measurement range in which the linearity error rises excessively because the precision of a Hall sensor is actually highest around the zero crossover of the induction. The maximum errors would occur in the case of maximum actuation in the region of +/– 45°, that is to say full load and idling, as temperature drift and aging effects would then be felt. On the other hand, the measurement precision would be highest in the intermediate range. However, a position detection device which is provided for a butterfly valve connecting piece should be particularly high precisely with small angles of aperture of the butterfly valve, and thus particularly small rotary movements of the butterfly valve shaft. For this reason, this application is not particularly well suited for a position detection device of a butterfly valve shaft. In addition, the precision levels which are usually required cannot normally be achieved with this last-mentioned principle, even with particularly long operating times. It also proves disadvantageous that the open sides of the approximately U-shaped yoke are open to magnetic interference fields, and there is thus the risk of the sensor signal being falsified from the outside.

As an alternative to a Hall sensor it is possible to use a magnetoresistive sensor, referred to below as MR sensor, in a contactless position detection device for detecting a rotary movement of a butterfly valve shaft. The MR sensor requires a field which turns in the plane which is formed by the sensor structure. For this it is necessary for the sensor element to be arranged perpendicularly with respect to the shaft, and thus not in a plane parallel to the axis of rotation of the shaft. As the output characteristic curve of MR sensors is periodic at 180°, the linear usable angular range is restricted to approximately 45°. For this reason, an MR sensor also does not usually have the angular range of approximately 90° which is necessary to detect a rotary movement of the butterfly valve shaft.

SUMMARY OF THE INVENTION

The invention is therefore based on the object of specifying a method of the abovementioned type with which the position of the butterfly valve shaft of the butterfly valve connecting piece can be reliably detected in a detection range of approximately 90° by means of a contactless position detection device even over relatively long time periods. In addition, a device which is suitable for the method is to be specified.

This object is achieved according to the invention in that the sensor has a first magnetoresistive sensor element and a second magnetoresistive sensor element, an approximately sinusoidal signal being generated in the first magnetoresistive sensor element and an approximately cosinusoidal signal being generated in the second magnetoresistive sensor element by means of the magnet when there is a rotary movement of the butterfly valve shaft, the first approximately sinusoidal signal and the second approximately cosinusoidal signal being fed to evaluation electronics which are arranged in the sensor, an approximately arctan-shaped signal being generated in the evaluation electronics from the approximately sinusoidal signal of the first magnetoresistive sensor element and the approximately cosinusoidal signal of the second magnetoresistive sensor element, the approximately arctan-shaped signal being fed to a control unit arranged outside the housing, a control signal being generated as a function of the approximately arctan-shaped signal in the control unit, and the control signal being fed to the actuator drive, arranged in the butterfly valve connecting piece, in order to adjust the butterfly valve shaft.

The invention is based here on the idea that a method which particularly reliably ensures detection of a rotary movement of a butterfly valve shaft of approximately 90°, even over particularly long time periods, should detect the respective current position of the butterfly valve shaft in a contactless fashion. This is possible by means of a sensor which comprises a magnetoresistive sensor element. However, this magnetoresistive sensor element does not have the necessary precision when detecting the position of the butterfly valve shaft. The precision of the detection can be increased by virtue of the fact that, instead of a single magnetoresistive sensor element, a second magnetoresistive sensor element is arranged in relation to the first magnetoresistive sensor element. If these two sensor elements then output approximately the same signal but with a phase shift, the current position of the butterfly valve shaft can be detected particularly precisely using the phase shift which can be determined comparatively precisely. For this purpose, a first and a second magnetoresistive sensor element are positioned in relation to a magnet which is arranged on the butterfly valve shaft, an approximately arctan-shaped signal, which characterizes the position of the butterfly valve shaft with sufficient precision, being capable of being generated from the signal of the first magnetoresistive sensor element and from the signal of the second magnetoresistive sensor element. The approximately arctan-shaped signal is independent of temperature here, whereas the amplitudes of the signals of the first magnetoresistive sensor element and of the second magnetoresistive sensor element are temperature-dependent.

The scaling (amplification, offset) of the sensor by means of an additional pin of the evaluation electronics is advantageously performed using a serial protocol, data for setting the characteristic curve being stored in a nonvolatile memory. This reduces the number of electronic components to a single one, a printed circuit board not being absolutely necessary.

The signal of the first magnetoresistive sensor element is advantageously subjected to plausibility checking with the signal of the second magnetoresistive sensor element. If a predefined plausibility condition is infringed, a signal is output which is recognizably outside the customary working range. As a result, a redundant embodiment of a first and second sensor, which is otherwise customary for safety reasons, can be dispensed with, making the method particularly easy to handle.

The object is achieved according to the invention with respect to the butterfly valve connecting piece by virtue of the fact that the magnet is of approximately ring-shaped design, and the sensor has a first magnetoresistive sensor element and a second magnetoresistive sensor element so that an approximately sinusoidal signal is generated in the first magnetoresistive sensor element and an approximately cosinusoidal signal is generated in the second magnetoresistive sensor element by means of the magnet when there is a rotary movement of the butterfly valve shaft, and that the two sensor elements for generating an approximately arctan-shaped signal are connected to evaluation electronics, and that the evaluation electronics are connected to a control unit arranged outside the housing, in order to generate a control signal for the actuator drive.

The two magnetoresistive sensor elements give rise to a high degree of precision when detecting the position of the butterfly valve shaft. However, if these two sensor elements output approximately the same signal but with a phase shift, the current position of the butterfly valve shaft can be detected particularly precisely using the phase shift which can be determined comparatively precisely. By means of the two magnetoresistive sensor elements it is possible to produce two characteristic curves which, as long as the characteristic curves are phase shifted, can be used according to the method described above to detect the rotary movement of the butterfly valve shaft particularly precisely.

It is advantageous if the magnet has diametrical magnetization. This results in a more homogenous field, as a result of which relatively large degrees of eccentricity between the sensor head and the magnet axis are acceptable without this leading to an unacceptable linearity error. As a result, the method mentioned above can be carried out particularly reliably even when there are structurally unavoidable imprecisions in the positioning between the magnet and the sensor.

Alternatively, the magnet comprises a first ring part segment and a second ring part segment, with both the first ring part segment and the second ring part segment being radially magnetized. The radial magnetization results in a less homogenous field in comparison with diametrical magnetization, the field lines of the magnetic field being focused in the center of the magnet. As a result, particularly high fields can be produced by means of radial magnetization of the magnet, which makes the position detection device particularly immune to interference fields.

In both embodiments, the sensor advantageously projects axially and centrally into the magnet. If the sensor projects axially and centrally into the magnet, the amplitude of the useful field is then particularly large in this position and the shielding effect against external interference fields is also particularly well utilized. As a result, the angular position of the shaft can be determined in a fault-free fashion even in the immediate vicinity of the electromagnetic drive.

The sensor advantageously comprises a first housing and a second housing, the first magnetoresistive sensor element and the second magnetoresistive sensor element being arranged in the first housing, and evaluation electronics being arranged in the second housing, the first housing being arranged approximately perpendicularly to the butterfly valve shaft, and the second housing being arranged approximately parallel to the butterfly valve shaft. As a result, the installation space which is necessary for the sensor has particularly small dimensions.

The evaluation electronics for setting the characteristic curve using a serial protocol advantageously comprise a pin. As a result, it is possible to dispense with a multiplicity of electrical components which would otherwise be necessary as an alternative to setting the characteristic curve.

The sensor is advantageously surrounded virtually completely by a sleeve made of plastic. If it is constructed in this way, the sensor forms a premolding which is encapsulated with plastic by means of injection molding when the lid is manufactured, as a result of which the lid of the housing of the butterfly valve connecting piece is fabricated.

The lid of the housing is advantageously made of plastic, the sensor being at least partially enclosed by the plastic of the lid. As a result of the integration of the sensor into the lid, the sensor can be integrated into the lid at a strictly predefined location. At the same time, the mounting step during which the sensor has to be arranged in the lid and adjusted in relation to the magnet is dispensed with.

The advantages which are achieved with the invention comprise, in particular, the fact that the method for detecting the position of the butterfly valve shaft operates in a contactless fashion and at the same time a degree of precision which is sufficient for detecting the position of the butterfly valve shaft is reliably ensured even over particularly long time periods. In this process, the signals of the first sensor element and of the second sensor element are detected simultaneously and also used for a plausibility checking means which transmits a corresponding signal to the control electronics in the case of a fault.

BRIEF DESCRIPTION OF THE SEVERAL VIEWS OF THE DRAWINGS

An exemplary embodiment of the invention will be explained in more detail with reference to a drawing, in which.

DETAILED DESCRIPTION OF THE INVENTION

Corresponding parts are provided with the same reference symbols in all the figures.

Figure 1:
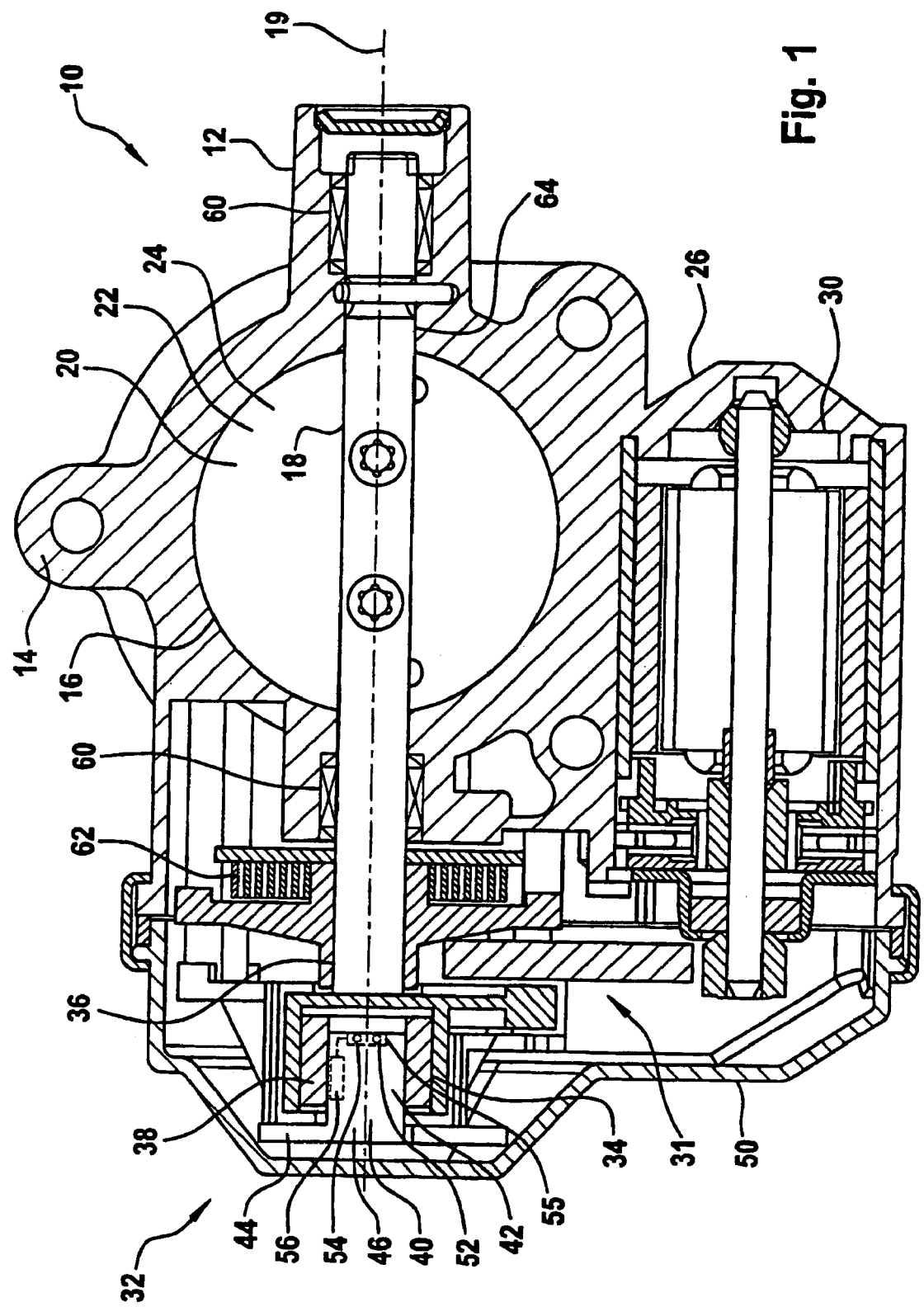
FIG. 1 is a schematic view of a butterfly valve connecting piece having a gearbox and an actuator drive.

The butterfly valve connecting piece 10 according to FIG. 1 has the purpose of supplying an air or fuel/air mixture to an actuator (not illustrated), for example an injection device of a motor vehicle (also not illustrated), the quantity of fresh gas which is to be fed to the actuator being capable of being controlled by means of the butterfly valve connecting piece 10. For this purpose, the butterfly valve connecting piece 10 has a housing 12 which is fabricated from metal 14 which is constructed from aluminum in this exemplary embodiment. Alternatively, the housing 12 can however also be manufactured from plastic using an injection molding method. The housing 12 comprises a continuous throttle orifice 16. Air or a fuel/air mixture can be fed to the actuator (not illustrated) via the throttle orifice 16.

In order to set the volume of fresh gas which is to be fed to the actuator, a butterfly valve 20 is arranged on a butterfly valve shaft 18 with an axis of rotation 19. The butterfly valve 20 is fabricated from a material 22 which is constructed as metal 24 in this exemplary embodiment. The metal 24 is in turn aluminum. Alternatively, the butterfly valve can however also be fabricated entirely or partially from plastic. A rotation of the butterfly valve shaft 18 simultaneously brings about pivoting of the butterfly valve 20 which is arranged on the butterfly valve shaft 18, as a result of which the active cross section of the throttle orifice 16 is increased or decreased. The throughflow rate of the air or fuel/air mixture through the throttle orifice 16 of the butterfly valve connecting piece 10 is regulated by increasing or decreasing the active cross section of the throttle orifice 16 through the butterfly valve 20.

The butterfly valve shaft 18 can be connected to a pulley (not illustrated in more detail) which is connected in turn via a Bowden cable to a setting device for a power request. The setting device can be embodied here as an accelerator pedal of a motor vehicle so that activation of this setting device by the driver of the motor vehicle the butterfly valve 20 can be moved from a position of minimum opening, in particular a closed position, into a position of maximum opening, in particular an open position, in order in this way to control the power output of the motor vehicle.

The butterfly valve shaft 18 (shown in FIG. 1) of the butterfly valve connecting piece 10 is in contrast capable of being set either in a subrange by an actuator drive and otherwise by means of the accelerator pedal, or else the butterfly valve 20 can be set by an actuator drive over the entire adjustment range. In these so-called E-gas or drive-by-wire systems, the mechanical power control, for example the depression of an accelerator pedal, is converted into an electrical signal. This signal is in turn fed to a control unit which generates an actuation signal for the actuator drive. In these systems there is no mechanical coupling between the accelerator pedal and the butterfly valve 20 during normal operation.

In order to adjust the butterfly valve shaft 18, and thus the butterfly valve 20, the butterfly valve connecting piece 10 therefore has a drive housing 26. The drive housing 26 is embodied in one piece with the housing 12 of the butterfly valve connecting piece 10, but the housing 12 of the butterfly valve connecting piece 10 and the drive housing 26 may also be embodied in two pieces as separate single-piece components.

An actuator drive 30 which can be actuated via a control unit 28 arranged outside the housing 12 and is embodied as an electric motor is arranged in the drive housing 26. The actuator drive 30 is suitably electrically connected to the control unit 28, which connection is not illustrated in more detail in the drawing. The control unit 28 transmits, to the actuator drive 30 which is embodied as an electric motor, a control signal C by means of which the actuator drive 30 which is embodied as an electric motor adjusts the butterfly valve shaft 18 using a gearbox 31. Here, the actual position of the butterfly valve shaft 18 is detected by means of a position detection device 32.

The position detection device 32 comprises a magnet 34 which is arranged at a first end 36 of the butterfly valve shaft 18. The magnet 34 is diametrically magnetized and embodied in one piece as a ring 38. A sensor 40 is arranged aligned with the axis of rotation 19 of the butterfly valve shaft 18, in the center 39 of the ring 38. The sensor 40 comprises a first housing 42 and a second housing 44. The two housings 42 and 44 of the sensor 40 are encapsulated with plastic 46 using injection molding. The two housings 42 and 44 which are encapsulated using plastic 46 are in turn integrated into the lid 50, also fabricated from plastic, of the butterfly valve connecting piece 10 by means of injection molding methods. In the first housing 42 of the sensor 40, a first sensor element 52 and a second sensor element 54 are arranged. In addition, a temperature sensor 55 is arranged on the housing 42 of the sensor 40. Evaluation electronics 56 are arranged in the second housing 44 of the sensor 40. The first housing 42 of the sensor 40 projects in a particularly space-saving way here into the ring 38 of the magnet 34. The second housing 44 of the sensor 40 which is permanently connected to the first housing 42 of the sensor 40 is arranged in the lid 50 of the housing 12 of the butterfly valve connecting piece 10, bent through 90° in relation to the first housing 42 of the sensor 40 and at right angles with respect to the axis of rotation 19 of the butterfly valve shaft 18.

The butterfly valve shaft 18 is mounted in bearings 60 which are arranged on both sides of the throttle orifice 16 in the housing 12. A spring system 62 with so-called restoring springs and/or emergency operation springs is accommodated between the one bearing 60 and the position detection device 32. The restoring springs and/or emergency operation springs of the spring system 62 cause the butterfly valve shaft 18 to be prestressed in the closing direction with the result that the actuator drive 30 which is embodied as an electric motor operates counter to the force of the restoring springs and/or emergency operation springs. A so-called restoring spring and/or emergency operation spring of the spring system 62 has the effect that if the actuator drive 30 which is embodied as an electric motor fails, the butterfly valve 20 is moved into a defined position which is normally above the idling speed.

Alternatively, or in addition, the butterfly valve shaft 18 can also protrude out of the housing 12 of the butterfly valve connecting piece 10 at the end 64 of the butterfly valve shaft 18 which faces away from the position detection device 32. It is then possible to mount, for example, a pulley (not illustrated in the drawing) at the end of the butterfly valve shaft 18, said pulley being connected to an accelerator pedal via a Bowden cable, which provides a mechanical means of predefining set point values. This mechanical coupling of the butterfly valve shaft 18 to the accelerator pedal (not illustrated in the drawing in more detail) can ensure that the butterfly valve connecting piece 10 operates in emergency situations, for example if the actuator drive fails.

When the butterfly valve connecting piece 10 is operating, the butterfly valve shaft 18 is pivoted by means of the actuator drive 30 which is embodied as an electric motor. As a result, the butterfly valve 20 which is attached to the butterfly valve shaft 18 clears the throttle orifice to a greater or lesser extent, as a result of which the quantity of fresh gas which is to be fed to the internal combustion engine is to be controlled.

Figure 2:
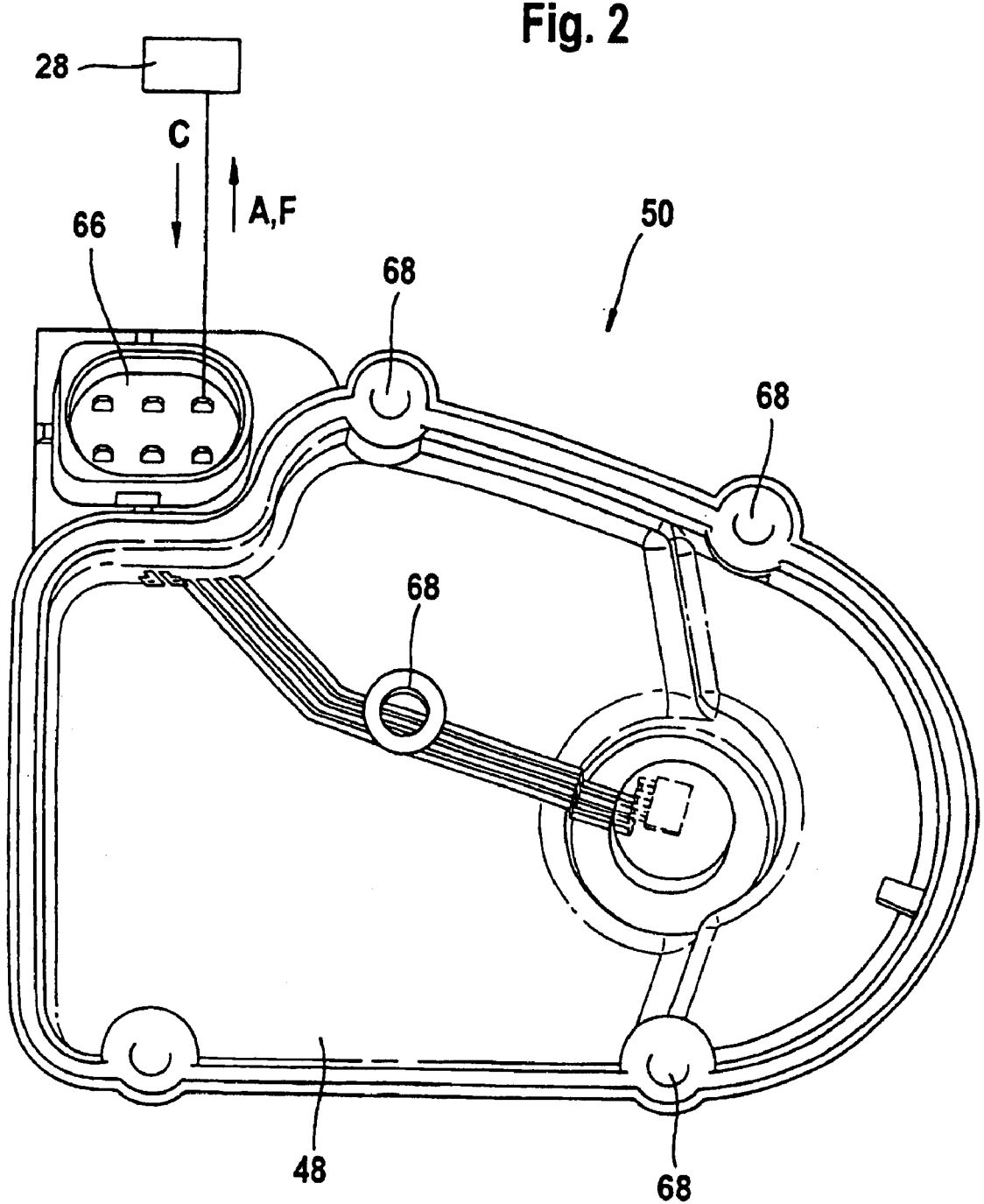
FIG. 2 is a schematic view of the lid of the butterfly valve connecting piece according to FIG. 1.

FIG. 2 is a schematic detailed view of the lid 50 of the housing 12 of the butterfly valve connecting piece 10. The sensor 40 which is surrounded by the plastic 46 is not represented raised from the inside in this plan view of the lid 50 as it protrudes out of the plane, facing the viewer. Electrical connections run from the sensor 40 to an electrical contact 66 which is arranged in the lid 50. The sensor 40 can be connected via this contact 66 to the control unit 28 which is arranged outside the butterfly valve connecting piece 10. At the same time, the sensor 40 can be supplied with electrical energy via the electrical contact 66. The lid 50 also has centering aids 68 via which the lid can be positioned in relation to the housing 12 of the butterfly valve connecting piece 10, and the sensor 40 can thus be positioned in relation to the magnet 34 arranged on the butterfly valve shaft 18.

Figure 3:
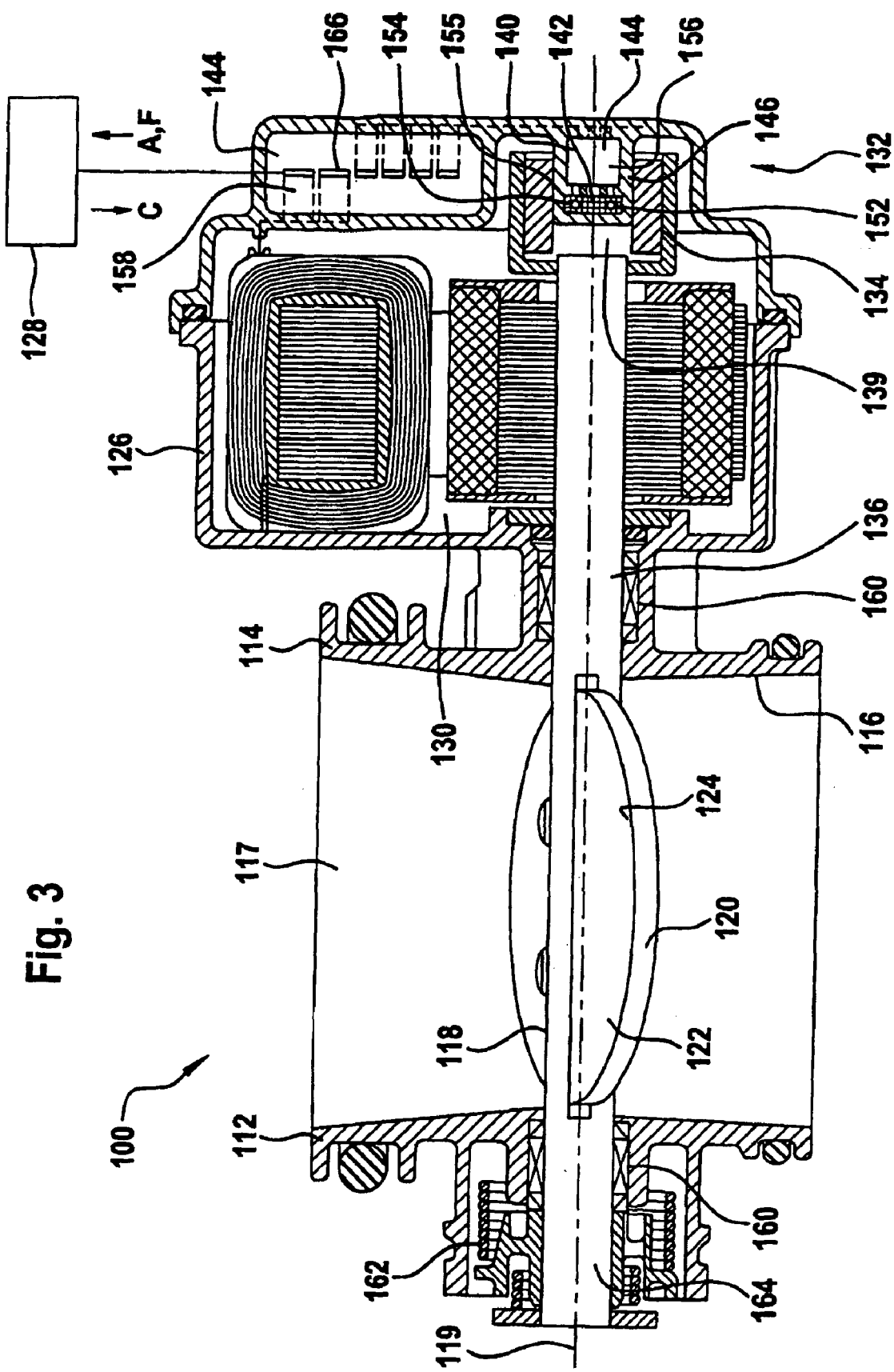
FIG. 3 is a schematic view of a butterfly valve connecting piece having a direct drive.

The butterfly valve connecting piece 100 according to FIG. 3 can be used in a motor vehicle in the same way as the butterfly valve connecting piece 10 according to FIG. 1. The butterfly valve connecting piece 100 comprises a housing 112 in which a continuous throttle orifice 116 is arranged. The throttle orifice 116 has an approximately cylindrical cross section 117. A butterfly valve 120 is arranged in the throttle orifice 116 on a butterfly valve shaft 118 which has an axis of rotation 119.

The butterfly valve shaft 118 can be directly adjusted by an electric actuator drive 130 which is arranged in a drive housing 126 and can be actuated via a control unit 128 which is arranged outside the housing 112. As a result, the butterfly valve connecting piece 100 according to FIG. 3 differs from the butterfly valve connecting piece 10 according to FIG. 1 in which the butterfly valve shaft can be driven indirectly by the actuator drive 30 via a gearbox 31. The actuator drive 130 is embodied here as a commutated electric motor.

The rotary movement of the butterfly valve shaft 118 of the butterfly valve connecting piece 100 can also be detected by a position detection device 132. The position detection device 132 comprises a magnet 134 which is arranged at a first end 136 of the butterfly valve shaft 118. A sensor 140 is arranged in the center 139 of the magnet 134 aligned with the axis of rotation 119 of the butterfly valve shaft 118. The sensor 140 comprises a first housing 142 and a second housing 144. The sensor 140 is encased virtually completely by plastic 146. The first housing 142 of the sensor 40 is arranged at a right angle with respect to the second housing 144 of the sensor 40. The sensor 140 which is encased with plastic 146 has been integrated as a premolding into the lid 150 of the butterfly valve connecting piece 100 when said lid 150 was manufactured using an injection molding method.

The sensor 140 comprises, in its first housing 142, a first magnetoresistive sensor element 152, a second magnetoresistive sensor element 154 and a temperature sensor 155. Evaluation electronics 156 are arranged in the second housing 144 of the sensor 140. The evaluation electronics 156 comprise a pin 158 via which the evaluation electronics 156 can be set in order to set the characteristic curve using a serial protocol. The pin 158 does not end in the electrical contact 166 which is embodied as an equipment plug, but instead contact is made only in the fabrication process, and is sealed off after that.

The butterfly valve shaft 180 is mounted in bearings 160. The butterfly valve connecting piece 100 also has a spring system 162 which is arranged at the end 164 of the butterfly valve shaft 118 which is applied to the position detection device 132. This spring system 162 can be used to position the butterfly valve shaft 118 into an emergency operating position if the actuator drive 130 fails.

Figure 4:
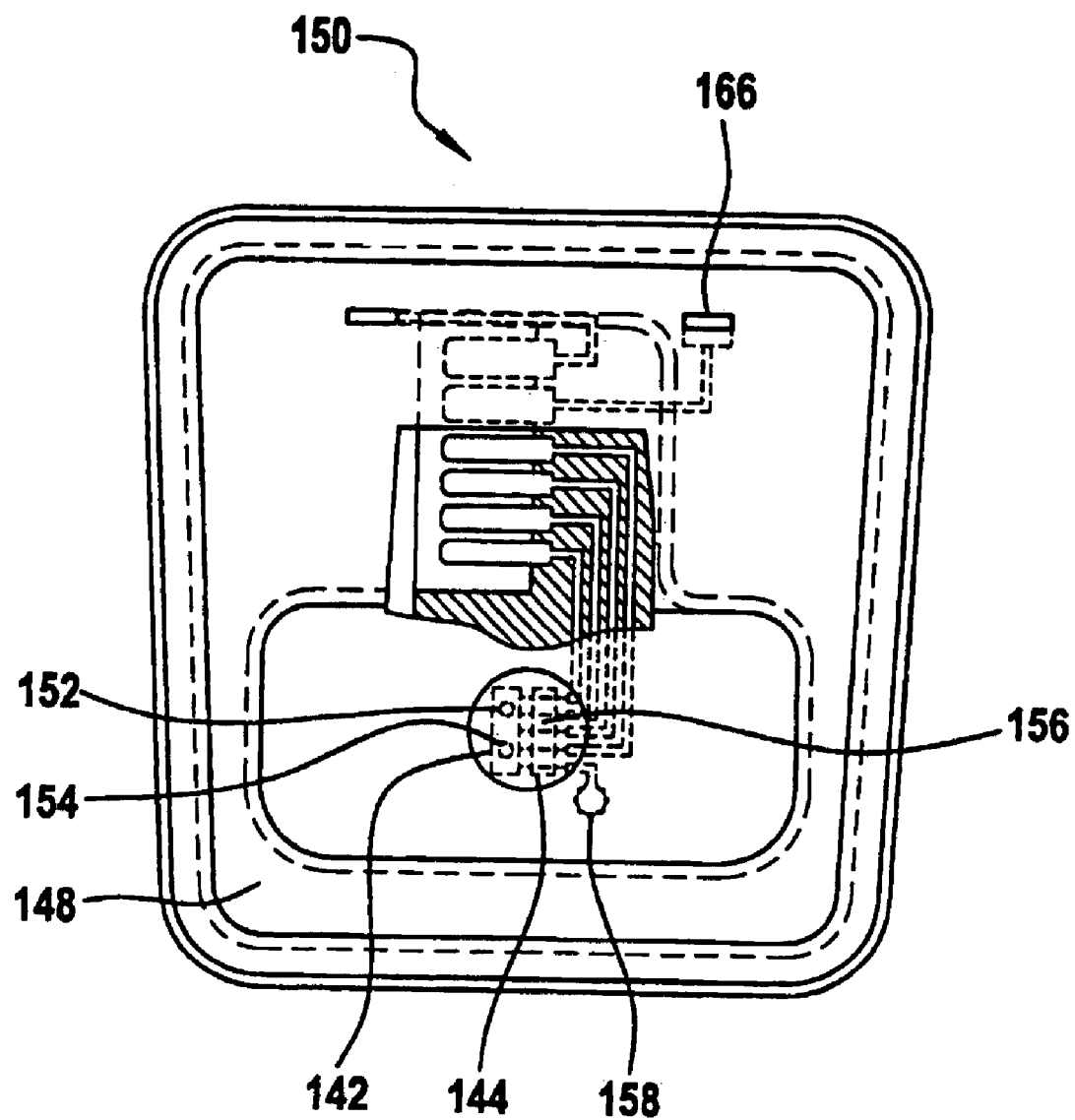
FIG. 4 is a schematic view of the lid of the butterfly valve connecting piece according to FIG. 3.

The lid 150 of the butterfly valve connecting piece 100 is illustrated in detail in FIG. 4. The lid 150 which is fabricated from plastic 148 comprises, virtually completely, the both the first housing 142 and the second housing 144 of the sensor 140. The second housing 144 of the sensor 140 projects out of the plane of the drawing in FIG. 4, which is not illustrated as raised owing to the plan view of the lid. The pins of the evaluation electronics 156 of the second housing 144 of the sensor 140, with which the evaluation electronics 156 can be connected to a control unit (not illustrated in more detail in the drawing), can be clearly made out.

Figure 5:
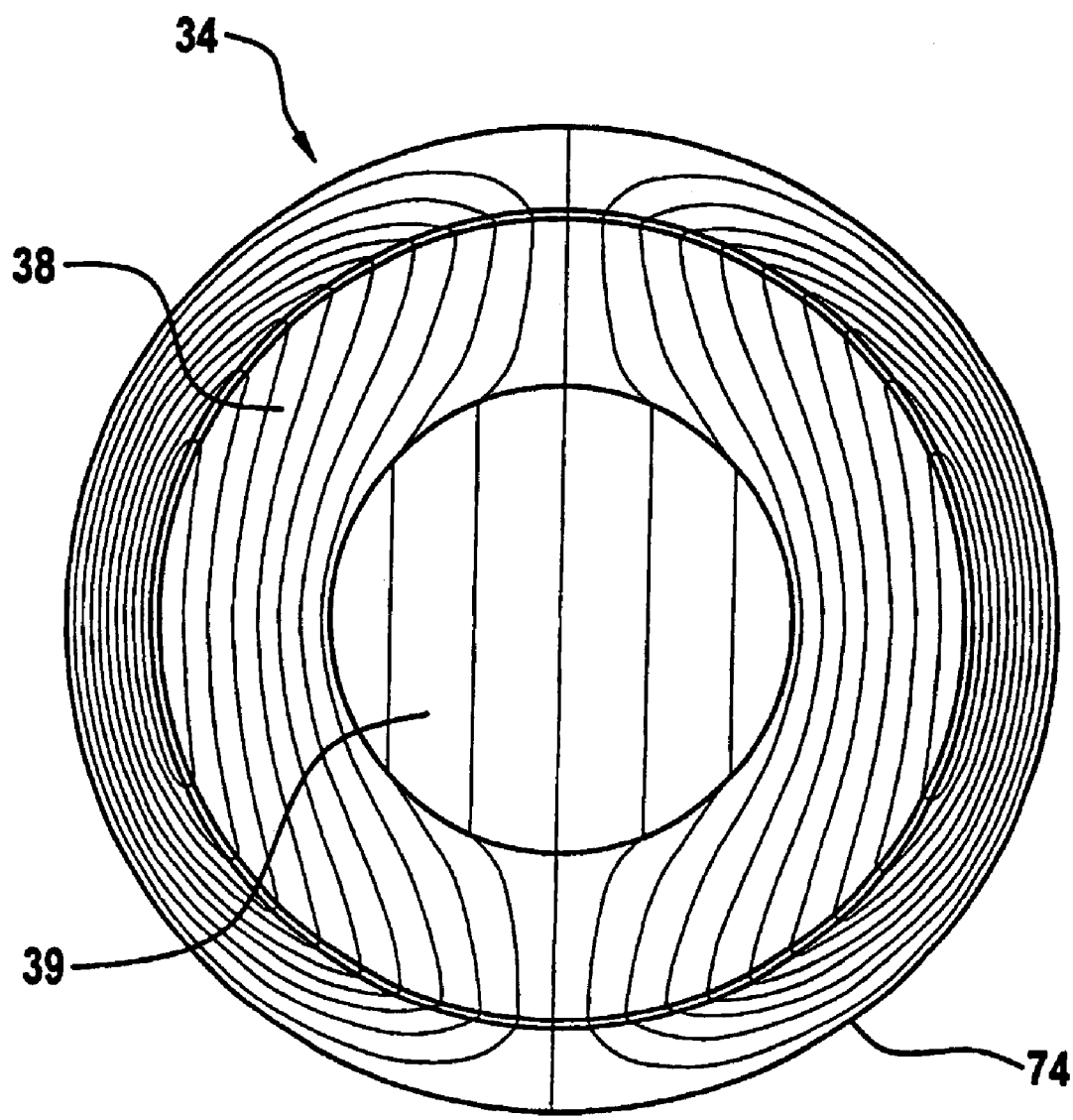
FIG. 5 depicts the configuration of the magnet of the butterfly valve connecting piece.

The configuration of the magnet 34 of the butterfly valve connecting piece 10 is shown by FIG. 5 in detail. It is possible to clearly see the diametrical field lines of the magnet 34, embodied as a ring 38, of the butterfly valve connecting piece 10. The ring 38 is surrounded here by a shielding ring 74. The field lines wander here approximately horizontally through the center 39 of the magnet 34 which is embodied as a ring 38. The center 39 is free of magnetic material. The sensor 40 can be positioned in the region of the center 39.

Figure 6:
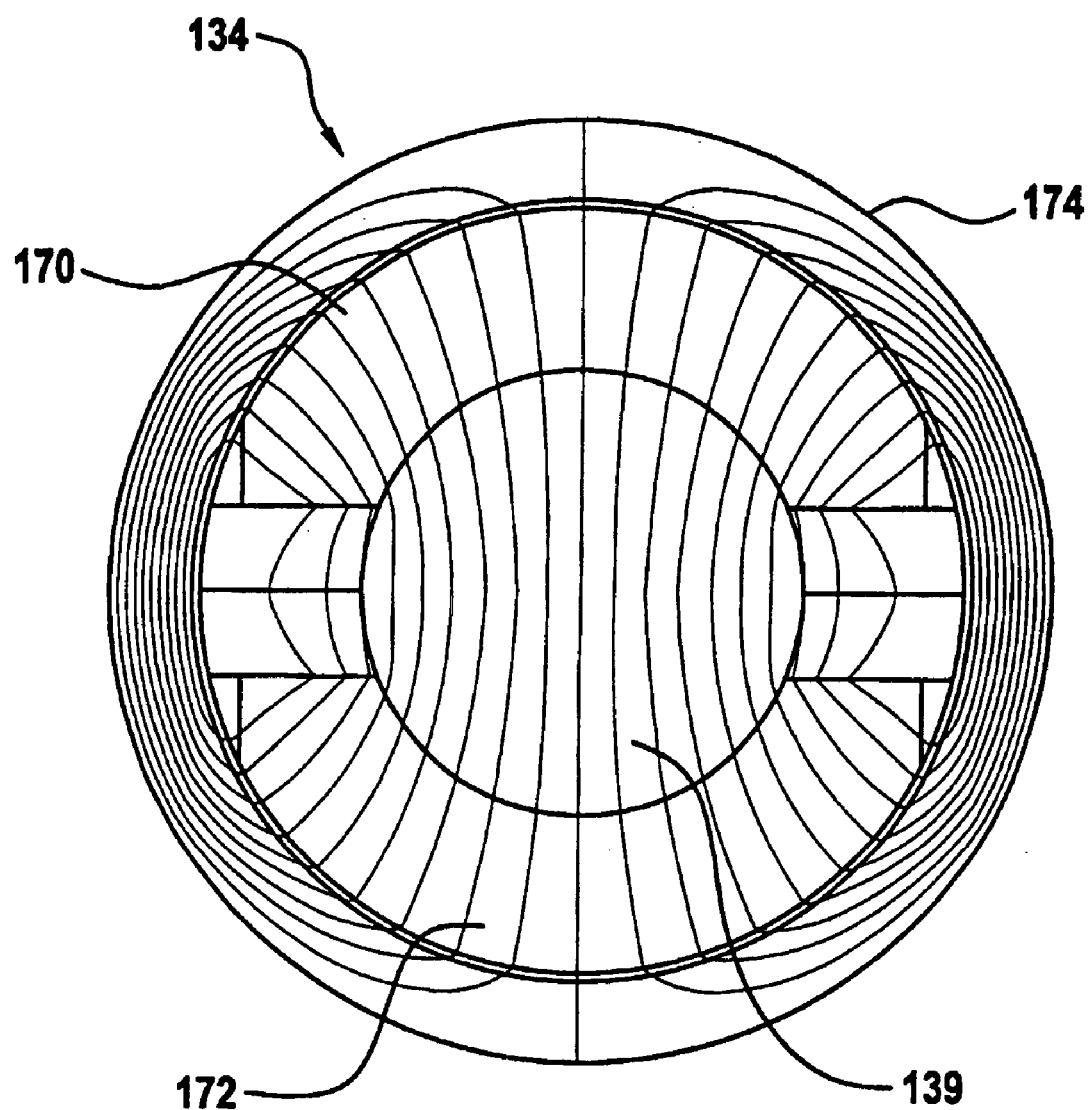
FIG. 6 depicts a radially magnetized magnet of the butterfly valve connecting piece.

In contrast to this, the magnet 134 of the butterfly valve connecting piece 100 is magnetized radially, which is shown in FIG. 6. For this purpose, the magnet 134 has a first ring part segment 170 and a second ring part segment 172. The field lines are focused significantly more strongly in the center in the case of the magnet 134 with radial magnetization than in the case of the magnet 34 with diametrical magnetization of the butterfly valve connecting piece 10. The magnet 134 has a shielding ring 174, in the same way as the magnet 34. No magnetic material is again arranged in the center 139 of the magnet 134. The sensor 140 can be positioned in this region.

Figure 7:
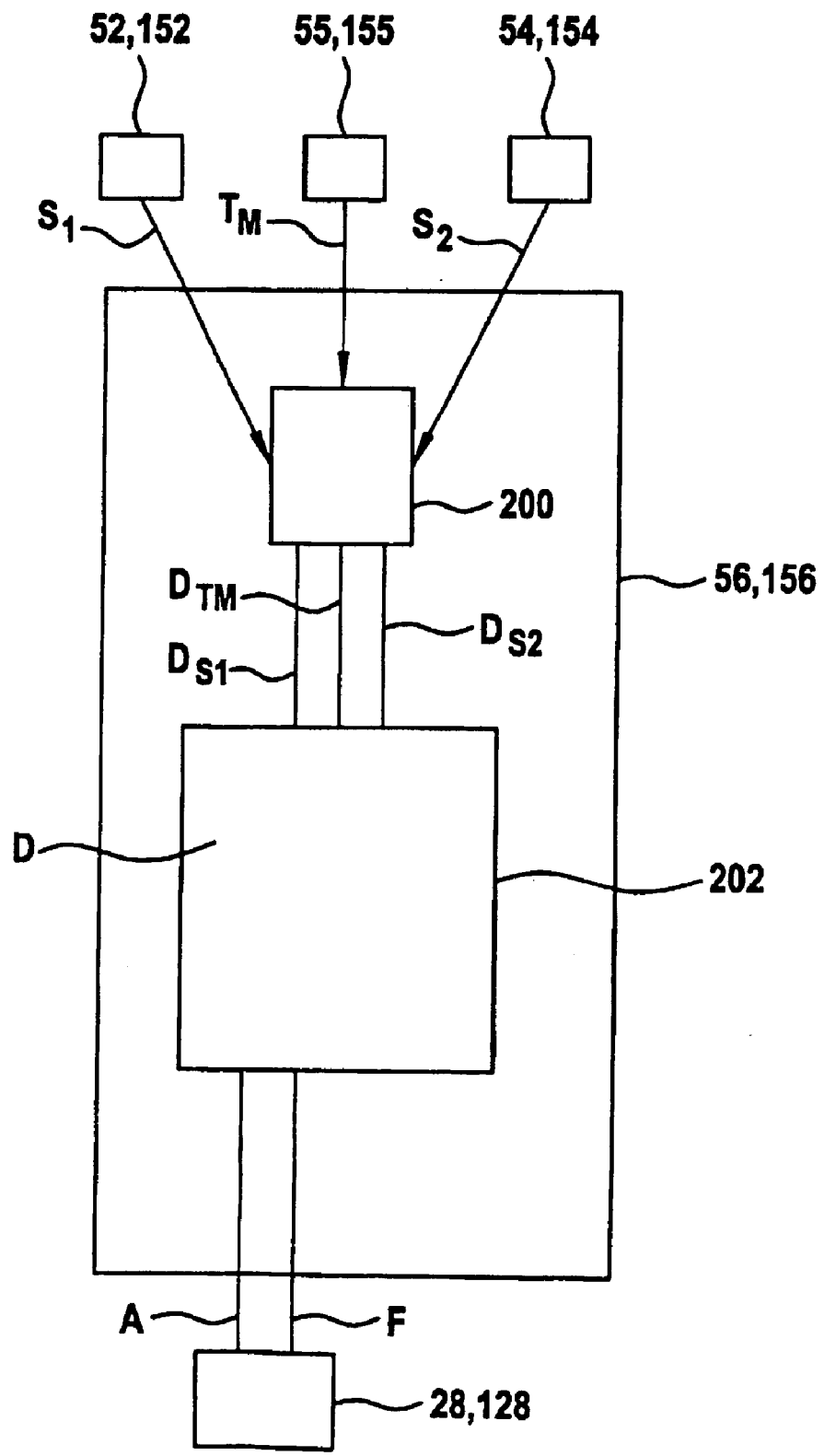
FIG. 7 depicts a method by which position detection devices of the butterfly valve connecting a piece can be operated.

Both the position detection device 32 of the butterfly valve connecting piece 10 and the position detection device 132 of the butterfly valve connecting piece 100 can be operated according to the same method, which is illustrated schematically in FIG. 7.

In this method, the first sensor element 52 or 152 and the second sensor element 54 or 154 are offset with respect to one another by a quarter period. As a result, when the butterfly valve connecting piece 10 or 100 operates, two signals $S_1$ and $S_2$ can be detected. The first signal $S_1$ is approximately sinusoidal and is supplied by the first sensor element 52 or 152. The second signal $S_2$ is approximately cosinusoidal and is supplied by the second sensor element 54 or 154. In addition, a temperature signal $T_M$ is continuously supplied via the temperature sensor 55 or 155. The two signals $S_1$ and $S_2$ as well as the temperature signal $T_M$ pass via electrical connecting means (not illustrated in more detail) into the second housing 44 or 144 of the sensor 40 or 140. They are fed to the evaluation electronics 56 or 156 in the housing 44 or 144.

The evaluation electronics 56 or 156 digitizes, by means of a digitization device 200, the first signal $S_1$, the second signal $S_2$ and the temperature signal $T_M$. Here, the digital signal $D_{S1}$ is produced from the first signal $S_1$, the digital signal $D_{S2}$ is produced from the second signal $S_2$, and the digital signal $D_{TM}$ is produced from the temperature signal $T_M$. The three digital signals $D_{S1}$, $D_{S2}$ and $D_{TM}$ are then fed to a computing unit 202 which is also arranged in the evaluation electronics 56 or 156. The computing unit 202 comprises a memory and a comparator unit, neither of which are illustrated in more detail in the drawing.

In the computing unit 202, an approximately arctan-shaped signal P is generated as a position signal from the first digital signal $D_{S1}$ and the second digital signal $D_{S2}$. The position signal P is compared in the comparator unit with data from the memory. The data of the memory 206 comprises both correction values (bridge offsets) of the sensor elements 52, 152 and 54, 154 which are necessary for correctly calculating the angular position of the butterfly valve shaft, as well as characteristic curve parameters for the outward characteristic curve, for example gradient and angle offset. From this comparison between the approximately arctan-shaped signal P and the data of the memory 206 it is possible to determine the current position of the butterfly valve shaft 18 or 118. The current position of the butterfly valve shaft 18 or 118 can be fed as an output signal A to the control unit 28 or 128. The control unit 28 or 128 outputs, as a function of the output signal A of the evaluation electronics 56 or 156, a control signal C which is transmitted to the actuator drive 30 or 130 and by means of which the actuator drive 30 or 130 can be actuated as a function of the currently detected position of the butterfly valve shaft 18 or 118.

When the method is carried out, a plausibility check of the signals $S_1$ and $S_2$ of the first sensor element 52 or 152 and of the second sensor element 54 or 154 takes place cyclically, that is to say at regular intervals in the evaluation electronics 56, 156, taking into account the measured temperature signal $T_M$. The two signals $S_1$ and $S_2$ of the sensor elements 52 or 152 and 54 or 154 follow approximately the functions here:

$$S_1 = S_{1max} * \sin(2*\Phi) * [1 + \alpha_1 * (T_{M1} - T_R)]$$

and $$S_2 = S_{2max} * \cos(2*\Phi) * (1 + \alpha_2 * (T_{M2} - T_R)).$$

$S_{1max}$ and $S_{2max}$ are amplitudes of the signals in the unit $M_v$,
$\Phi$ is the mechanical angle through which the butterfly valve shaft 18, 118 has rotated,
$\alpha_1$, $\alpha_2$ are temperature coefficients in
1/K, the unit
$T_R$ Reference temperature The amplitudes temperature response of the signals $S_1$ and $S_2$ is taken into account here by the difference between the measured temperature and the reference temperature. The reference temperature is usually room temperature.

As both sensor elements 52, 54 and 152, 154 are constructed on the same substrate, a single temperature sensor can be used for the temperature measurement, said sensor supplying the measured temperature $T_M$. Correspondingly, the temperature coefficients can also be equated:

$$T_{M1}=T_{M2}=T_m,$$

$$\alpha_1=\alpha_2=\alpha.$$

These equations characterize the signals $S_1$ and $S_2$. In the case of fault-free function the following must apply:

$$\sin^2(2\Phi)+\cos^2(2\Phi)=1.$$

This condition is additionally integrated cyclically in the computing unit 202. When this condition is infringed, a signal F, which lies recognizably outside the normal working range, is output. This signal F can also be fed, in a way which is not illustrated in more detail, to the control unit which is also not illustrated in more detail in the drawing. This safety function makes it possible to dispense with a redundant design, as a result of which the position detection device 32 or 132 has a particularly simple design. In addition, for compatibility reasons and in order to be able to detect errors in the transmission link, two complementary characteristic curves are output. As a result of the temperature information being taken into account, the plausibility check reliably takes place in a temperature range of, for example, −40° to +140° C.

The method is characterized by the fact that two signals $S_1$ and $S_2$ which are phase shifted with respect to one another can be generated by means of a magnetoresistive sensor 40 or 140 which has a first magnetoresistive sensor element 152 or 52 and a second magnetoresistive sensor element 54 or 154. The current position of the butterfly valve shaft 18 or 118 can be detected with sufficient precision by means of these two signals $S_1$ and $S_2$. At the same time, it is particularly reliably ensured that the device does not have any mechanical wear phenomena even when the method operates for a particularly long time.

I claim:

1. A method for contactless detection of a position of a butterfly valve shaft of a butterfly valve connecting piece, the butterfly valve connecting piece having a housing which can be closed off by a lid and a throttle orifice which is arranged in the housing, for a butterfly valve which is arranged on the butterfly valve shaft, the butterfly valve shaft being capable of being driven by an electric actuator drive and having, at one of its ends, a magnet which is arranged in contactless alignment with a sensor which is arranged on the lid, said method comprising the steps of:
providing the sensor with a first magnetoresistive sensor element and a second magnetoresistive sensor element,
generating an approximately sinusoidal signal in the first magnetoresistive sensor element and an approximately cosinusoidal signal in the second magnetoresistive sensor element by means of the magnet when there is rotational movement of the butterfly valve shaft,
feeding the first approximately sinusoidal signal and the second approximately cosinusoidal signal to evaluation electronics arranged in the sensor,
generating an approximately arctan-shaped signal in the evaluation electronics from the approximately sinusoidal signal of the first magnetoresistive sensor element and the approximately cosinusoidal signal of the second magnetoresistive sensor element,
generating a control signal as a function of the approximately arctan-shaped signal in a control unit arranged outside the housing, and
feeding the control signal to the actuator drive arranged in the butterfly valve connecting piece in order to adjust the butterfly valve shaft.

2. The method according to claim 1, further comprising the steps of:
scaling an output signal of the sensor by means of an additional pin of the evaluation electronics using a serial protocols; and
storing data for setting the characteristic curve in a nonvolatile memory.

3. The method according to claim 1, further comprising the steps of cyclically subjecting the signal of the first magnetoresistive sensor element to plausibility checking using the signal of the second magnetoresistive sensor element.

4. A butterfly valve connecting piece, comprising:
a housing having walls defining a cavity and an opening;
a lid arranged on said housing to close off said opening;
a butterfly valve shaft comprising a magnet at one end, said magnet having an approximately ring-shaped design;
a butterfly valve arranged on said butterfly shaft;
a throttle orifice for said butterfly valve, said orifice arranged within said housing,
an electric actuator device for driving said shaft, said actuator device connected to said shaft;
a sensor in contactless alignment with said magnet, said sensor comprising a first magnetoresistive sensor element and a second magnetoresistive sensor element such that an approximately sinusoidal signal is generated in the first magnetoresistive sensor element and an approximately cosinusoidal signal is generated in the second magnetoresistive sensor element when there is a rotary movement of the butterfly valve shaft, the first and second sensor elements comprising means for generating an arctan-shaped signal;
a control unit arranged outside of the housing; and
evaluation electronics electronically coupled with the first and second sensor elements and the control unit so as to generate a control signal for the actuator drive within the control unit.

5. The butterfly valve connecting piece according to claim 4, wherein the magnet has diametric magnetization.

6. The butterfly valve connecting piece according to claim 4, wherein the magnet comprises a first ring part segment and a second ring part segment, and both the first ring part segment and the second ring part segment are radially magnetized.

7. The butterfly valve connecting piece according to claim 4, wherein the sensor projects axially and centrally into the magnet.

8. The butterfly valve connecting piece according to claim 7, wherein the sensor comprises a first and a second housing, the first sensor element and the second sensor element are arranged in the first housing, and the evaluation electronics are arranged in the second housing, the first housing is arranged approximately perpendicularly to the butterfly valve shaft and the second housing is arranged approximately parallel to the butterfly valve shaft.

9. The butterfly valve connecting piece according to claim 8, wherein the evaluation electronics comprise a pin for setting a characteristic curve using a serial protocol.

10. The butterfly valve connecting piece according to claim 4, wherein the sensor is substantially surrounded by plastic.

11. The butterfly valve connecting piece according to claim 10, wherein the lid of the housing comprises plastic, and the sensor is at least partially enclosed by the plastic of the lid.

* * * * *